United States Patent [19]

Takase et al.

[11] Patent Number: 5,500,674
[45] Date of Patent: Mar. 19, 1996

[54] METHOD OF DRIVING SOLID-STATE IMAGE SENSOR AND SOLID-STATE IMAGING APPARATUS

[75] Inventors: Satoshi Takase; Takuya Imaide, both of Yokohama; Toshiro Kinugasa, Hiratsuka; Ryuji Nishimura, Yokohama, all of Japan

[73] Assignee: Hitachi, Ltd., Tokyo, Japan

[21] Appl. No.: 370,175

[22] Filed: Jan. 9, 1995

Related U.S. Application Data

[62] Division of Ser. No. 239,857, May 9, 1994, Pat. No. 5,402,169, which is a continuation of Ser. No. 892,994, Jun. 3, 1992, abandoned.

[30] Foreign Application Priority Data

Jun. 3, 1991 [JP] Japan .................................. 3-157412
Jun. 4, 1991 [JP] Japan .................................. 3-159441

[51] Int. Cl.[6] ................................................. H04N 5/335
[52] U.S. Cl. ........................ 348/208; 348/240; 348/316
[58] Field of Search .................................. 348/207, 208, 348/240, 294, 300, 311, 314, 312, 316; H04N 5/335

[56] References Cited

U.S. PATENT DOCUMENTS

| | | | |
|---|---|---|---|
| 4,638,362 | 1/1987 | Oshima et al. | 358/213.26 |
| 4,689,686 | 8/1987 | Hashimoto et al. | 358/213.26 |
| 4,858,020 | 8/1989 | Homma | 358/287 |
| 4,942,473 | 7/1990 | Zeevi et al. | 358/213.26 |
| 4,963,981 | 10/1990 | Todaka et al. | 358/213.13 |
| 5,019,912 | 5/1991 | Matsuda | 358/213.26 |
| 5,144,445 | 9/1992 | Higashisutsumi | 348/312 |
| 5,196,939 | 3/1993 | Elabd et al. | 348/314 |
| 5,402,169 | 3/1995 | Takase et al. | 348/240 |

FOREIGN PATENT DOCUMENTS 1-228280  9/1989  Japan .

OTHER PUBLICATIONS

T. Kinugasa et al., "Electronic Image Stabilizer for Video Camera Use", *IEEE Trans. on Consumer Electronics*, vol. 36, No. 3, Aug. 1990, pp. 520–525.

*Primary Examiner*—Michael T. Razavi
*Assistant Examiner*—Tuan V. Ho
*Attorney, Agent, or Firm*—Antonelli, Terry, Stout & Kraus

[57] ABSTRACT

In a method of driving a solid-state image sensor having an effective pixel area formed of a plurality of pixels in an array having M pixels in the vertical direction and N pixels in the horizontal direction, a scanning pixel area formed of m pixels in the vertical direction and n pixels in the horizontal direction (where M>m, N≧n) is established within the effective pixel area, and charges stored in the pixels in the scanning pixel area are transferred by vertical CCDs driven by a first scanning pulse to a horizontal CCD and the charges transferred to the horizontal CCD are transferred by the horizontal CCD driven by a second scanning pulse to an output portion of the horizontal CCD. Further, while the driving of the horizontal CCD is stopped, the vertical CCDs are driven by a third scanning pulse having a higher frequency than the frequency of the first scanning pulse so that charges stored in the pixels in the effective pixel area outside the scanning pixel area are transferred at high speed to the horizontal CCD of which driving is stopped. The charges transferred from the vertical CCDs to the horizontal CCD at high speed are swept out of the horizontal CCD.

2 Claims, 13 Drawing Sheets

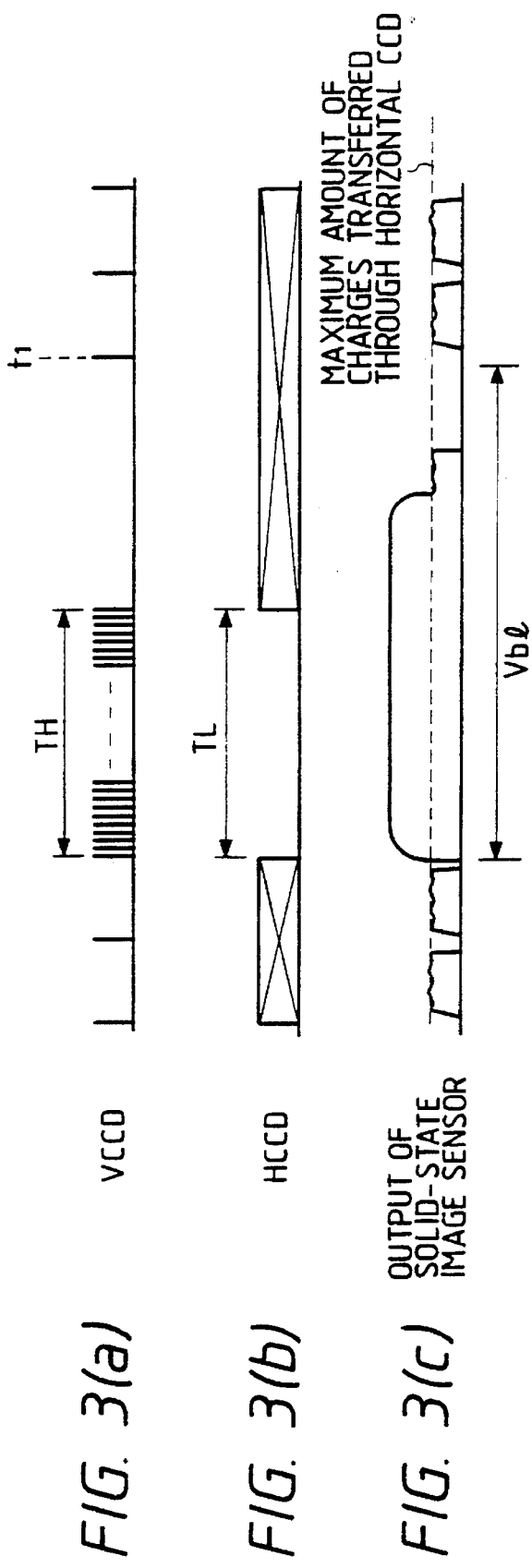

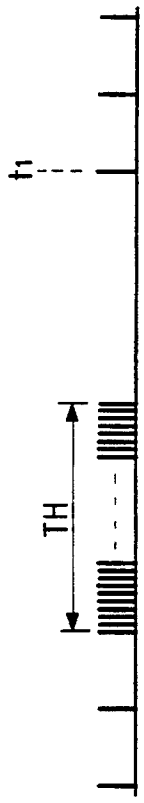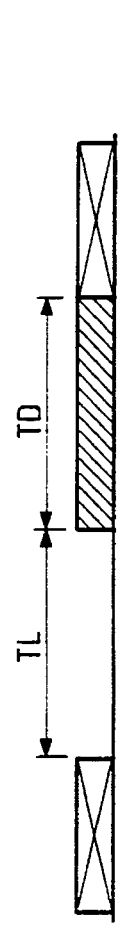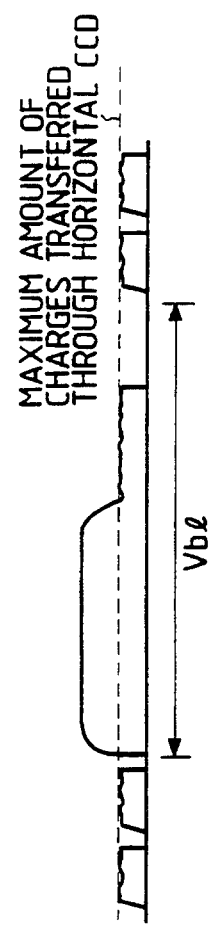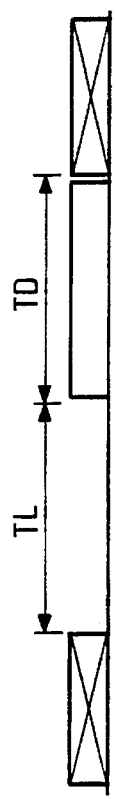

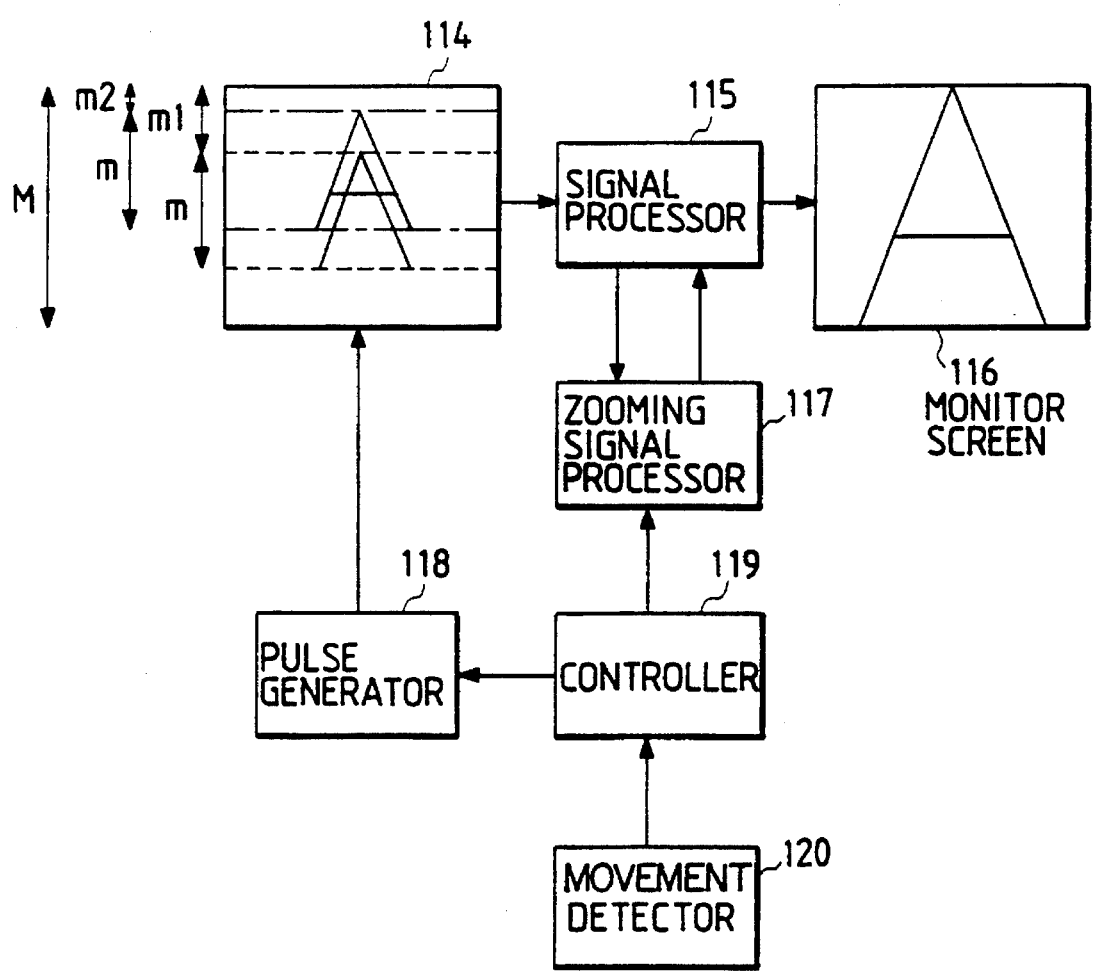

METHOD OF DRIVING SOLID-STATE IMAGE SENSOR AND SOLID-STATE IMAGING APPARATUS

This is a division of application Ser. No. 239,857 filed on May 9, 1994, U.S. Pat. No. 5,402,169, which is a continuation of application Ser. No. 892,994 filed on Jun. 3, 1992, now abandoned.

BACKGROUND OF THE INVENTION

The present invention relates to a method of driving a solid-state image sensor and a solid-state imaging apparatus using a solid-state image, and more particularly to a method of driving a solid-state image sensor and a solid-state imaging apparatus attaining an electronic zooming function or an image stabilizing function (such functions are realized by generating a video signal from charges stored in pixels in a portion of an entire effective pixel area of the solid-state image sensor).

With the spread of video cameras in recent years, demands from users for various functions of the cameras have become diversified. At the same time, with the progress of the semiconductor technologies and the increase in packaging density of devices on substrates, video cameras are becoming more and more smaller in size and lighter in weight.

One of the functions of video cameras is a zooming function. In the past, the zooming function was realized by the use of a zooming-lens formed of a plurality of lenses in combination provided with a complex cam mechanism. When zooming of a higher power was demanded from such cameras by users, it was provided by increasing the number of lenses. By such an arrangement, however, the portion of the video camera occupied by the lenses increases, and it goes against the objective to develop video cameras of smaller size and lighter weight.

To overcome the above described difficulties, there is proposed an electronic zooming function, as disclosed in Japanese Patent Application Laid-Open No. 1-228280 and the like, in which the method for driving a solid-state image sensor is adapted such that the driving pulse of the solid-state image sensor is controlled to provide an increased number of pulses during one horizontal scanning period (hereinafter called 1H) and vertical CCDs of the solid-state image sensor are thereby quickly transferred, and thus a zooming function is performed without increasing the number of lenses.

As the camera becomes smaller in size, image movement is likely to occur. When the camera is moved by movement of the operator's hands supporting the camera, the image will unpleasantly move when the shot image is reproduced.

To compensate for such image movement, there is proposed a method disclosed, for example, in a paper "Electronic Image Stabilizer for Video Camera Use" by Toshiro Kinugasa et al., *IEEE Transactions on Consumer Electronics*, Vol. 36, No. 3, August 1990, pp. 520–525, in which a detector for detecting image movement is provided in a video camera and a pulse signal output from a driver for driving a solid-state image sensor is controlled by the detection output signal from the detector to change the position of the scanning pixel area within the effective pixel area to such an extent that a camera movement is canceled and thereby the image movement is compensated for.

SUMMARY OF THE INVENTION

In the prior art method as described above, the number of pulses in 1H for driving tile solid-state image sensor is made greater than that in the normal operation to thereby sweep out charges in the effective pixel area outside the scanning pixel area. While in the normal operation, charges are transferred from vertical CCDs to a horizontal CCD once for each 1H period, charges in the above described prior art method are transferred several times in 1H from the vertical CCDs to the horizontal CCD. Accordingly, when a very bright object is shot, a great amount of charges exceeding the maximum quantity that can be normally transferred by the horizontal CCD will have to be transferred from the vertical CCDs to the horizontal CCD.

Therefore, it takes several to several tens of horizontal scanning periods for sweeping out the unwanted charges from the pixels in the effective pixel area outside the scanning pixel area, and hence it sometimes occurs that the unwanted charges cannot fully be swept out within the vertical blanking period. Consequently, there arises a problem that the charges remaining untransferred in the horizontal CCD appear on the monitor screen as a white strip image.

An object of the present invention is to provide a method of driving a solid-state image sensor and a solid-state imaging apparatus whereby the above described problem is solved and deterioration in the image on the screen due to unwanted charges remaining in the horizontal CCD can be prevented.

In order to achieve the above described object, in an embodiment of the present invention the scanning pulse for driving the horizontal CCD is shut off and the charge transfer in the horizontal CCD is stopped while the charges in the pixels in the effective pixel area outside the scanning pixel area are being scanned at high-speed and swept out.

In another embodiment of the present invention, the scanning pulse for driving the horizontal CCD is increased to a higher frequency than the normal frequency after scanning of the vertical CCDs at high speed for sweeping out the charges in the pixels in the effective pixel area outside the scanning pixel area has been finished, and thereby the horizontal CCD is scanned at high speed and charges remaining untransferred in the horizontal CCD are swept out.

In another embodiment of the present invention, while the charges in the pixels in the effective pixel area outside the scanning pixel area are being scanned at high speed to be swept out, the reset gate of the solid-state image sensor is controlled to be reset.

When the driver of the solid-state image sensor is controlled so that the scanning pixel area is changed in position, the charge transfer in the horizontal CCD is stopped while the charges in the pixels in the effective pixel area outside the scanning pixel area are being scanned at high speed to be swept out, and therefore the charges transferred from the vertical CCDs to the horizontal CCD are swept out from the output gate depending on the potential gradient in the charge storing portion of the horizontal CCD.

Further, after scanning of the vertical CCDs at high speed has been finished, the scanning pulse for driving the horizontal CCD is increased to a higher frequency than the normal frequency so that the horizontal CCD is scanned at high speed. Therefore, the number of times the horizontal CCD is driven is increased, and hence the charges being unable to be transferred only by the potential gradient and remaining in the horizontal CCD can be swept out.

Further, since the reset gate of the solid-state image sensor is held in the reset state while the pixels in the effective pixel area outside the scanning pixel area are being scanned at high speed, the effect to reduce the remaining charges in the horizontal CCD can be much improved.

In order to achieve the above described object, a further embodiment of the present invention is provided with a path for sweeping out unwanted charges in the horizontal CCD therethrough in addition to the usual charge transferring path.

Then, the unwanted charges in the effective pixel area outside the scanning pixel area are swept out to the outside through the path for sweeping out the charges. Accordingly, when the charges from the pixels in the scanning pixel area are transferred from the vertical CCDs to the horizontal CCD, there remain no unwanted charges in the horizontal CCD, and hence there occurs no leakage of charges from the pixels in the effective pixel area outside the scanning pixel area into the video signal.

BRIEF DESCRIPTION OF THE DRAWINGS

FIGS. 3(a) and 3(b) are timing charts of scanning pulses in the driver shown in FIG. 1(a);

FIG. 3(c) is a timing chart showing an output waveform from the solid-state image sensor shown in FIG. 1(b) driven by the scanning pulses shown in FIGS. 3(a) and 3(b);

FIGS. 5(a) and 5(b) are timing charts of scanning pulses in the driver shown in FIG. 4;

FIG. 5(c) is a timing chart showing an output 10 waveform from the solid-state image sensor shown in FIG. 1(b) driven by the scanning pulses shown in FIGS. 5(a) and 5(b);

FIGS. 6(a), 6(b), and 6(c) are timing charts showing scanning pulses and a reset gate pulse in a third embodiment of a driving method of a solid-state image sensor according to the present invention;

FIG. 6(d) is a timing chart of a reset gate pulse in the first and second embodiments;

FIG. 20 is a block diagram of another example of a solid-state imaging apparatus employing the solid-state image sensor shown in FIG. 13 or FIG. 16.

DETAILED DESCRIPTION OF THE PREFERRED EMBODIMENTS

Embodiments of the present invention will be described below with reference to the accompanying drawings.

Figure 1A:
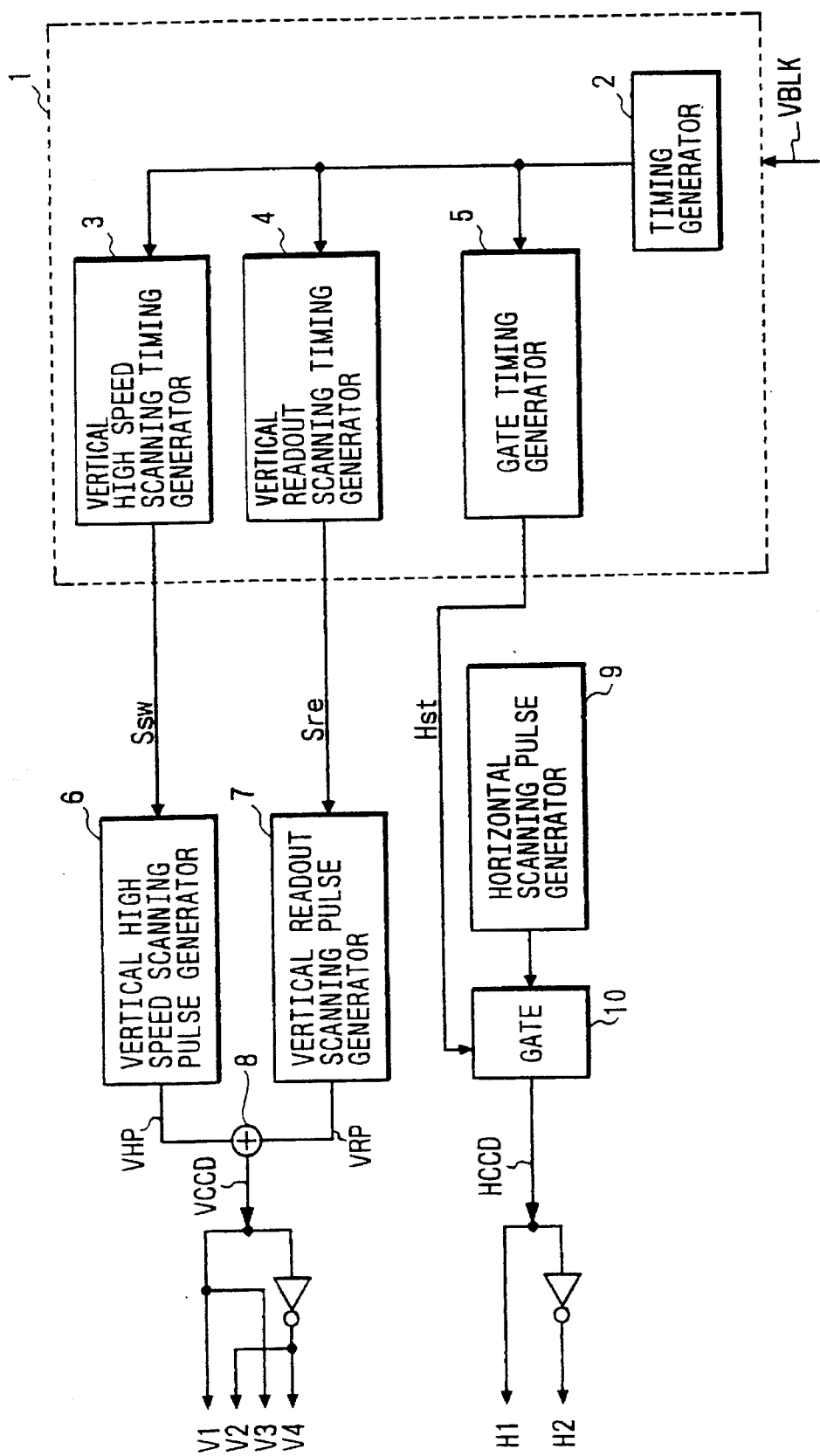
FIG. 1(a) is a block diagram showing a driver carrying out a first embodiment of a driving method of a solid-state image sensor according to the present invention.

FIG. 1(a) is a block diagram showing a driver carrying out an embodiment of a method of driving a solid-state image sensor according to the present invention, in which reference numeral 1 denotes a controller, 2 denotes a timing generator, 3 denotes a vertical high speed scanning timing generator, 4 denotes a vertical readout scanning timing generator, 5 denotes a gate timing generator, 6 denotes a vertical high speed scanning pulse generator, 7 denotes a vertical readout scanning pulse generator, 8 denotes an adder, 9 denotes a horizontal scanning pulse generator, and 10 denotes a gate circuit.

In FIG. 1(a), the vertical readout scanning pulse generator 7 generates a vertical readout scanning pulse, of which the period is 1H, every horizontal blanking period. The vertical readout scanning pulse is supplied to vertical CCDs of the solid-state image sensor, not shown, as a vertical CCD scanning pulse VCCD through the adder 8. The horizontal scanning pulse generator 9 generates a horizontal CCD scanning pulse HCCD whose period is a quotient of 1H divided by an integer. The horizontal CCD scanning pulse HCCD is supplied to a horizontal CCD of the solid-state image sensor.

Figure 1B:
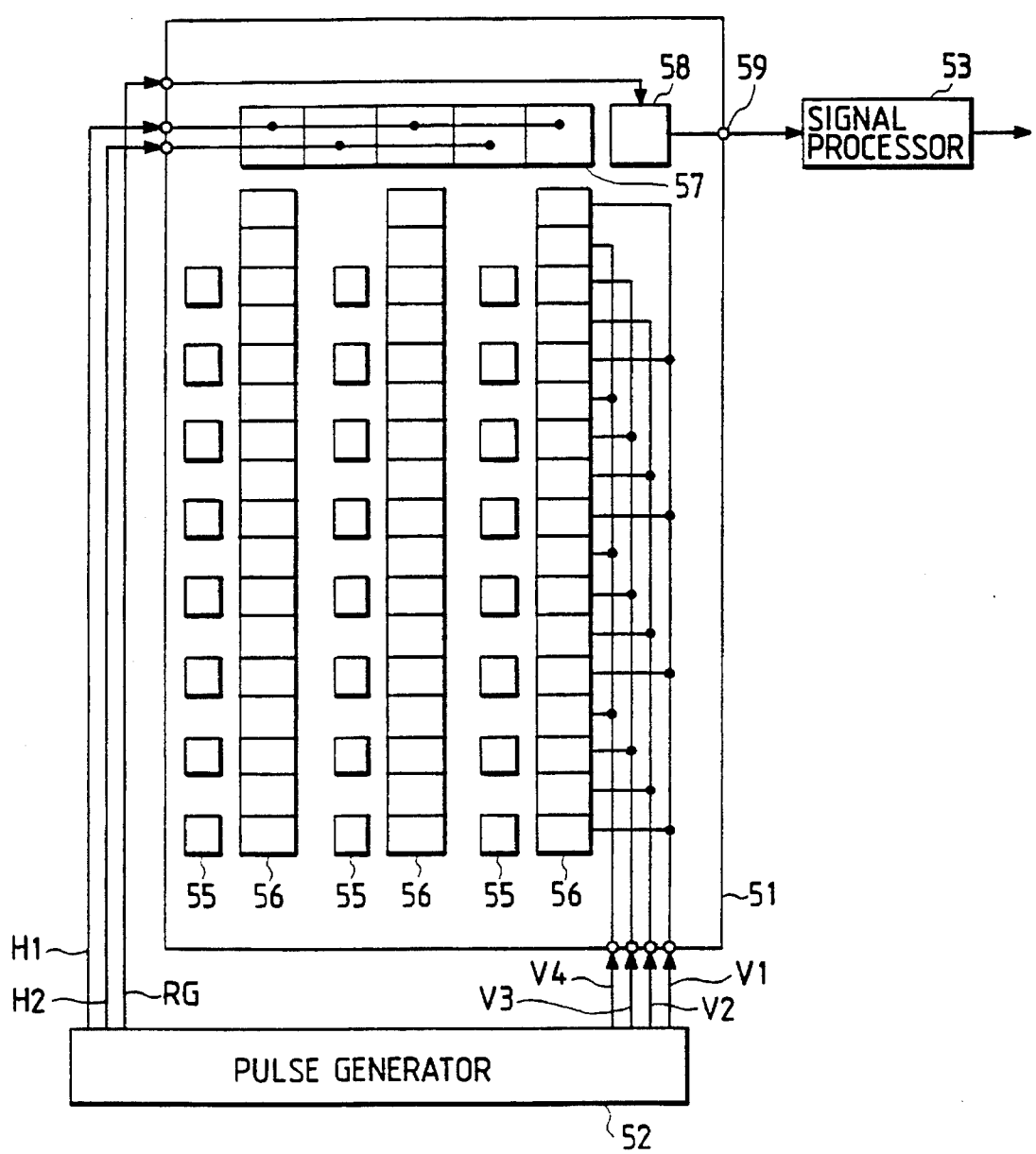
FIG. 1(b) is a plan view showing an example of a solid-state image sensor driven by a driving method according to the present invention.

A solid-state image sensor 51 is, as shown in FIG. 1(b), made up of pixels 55 in an M-row×N-column array, which has M pixels in the vertical direction and N pixels in the horizontal direction, vertical CCDs 56, a horizontal CCD 57, an output portion 58, etc. The vertical CCD 56 is provided for each column of the pixels 55 such that charge storing portions of the vertical CCD 56 oppose corresponding pixels in that column. The horizontal CCD 57 is arranged such that its charge storing portions oppose the last charge storing portion of each of the vertical CCDs 56.

In operation in an ordinary image pickup mode, first in the vertical blanking period, charges stored in each pixel 55 are transferred to the corresponding charge storing portion of the vertical CCD 56. Then, when the vertical blanking period is over, charges in each of the charge storing portions of the vertical CCD 56 are transferred to the adjoining charge storing portion, one stage for each vertical CCD scanning pulse from the vertical readout scanning pulse generator 7, whereby charges in the last charge storing portion of each vertical CCD 56 are transferred to the opposing charge storing portion of the horizontal CCD 57 every horizontal blanking period. When the horizontal blanking period during which charges are transferred to the horizontal CCD is over, charges in each of the charge storing portions of the horizontal CCD are transferred to the adjoining charge storing portion, one stage for each horizontal CCD scanning pulse HCCD from the horizontal scanning pulse generator 9 before the start of the following horizontal blanking period. Thereby, charges in a row of pixels are sequentially output from the last charge storing portion of the horizontal CCD 57 to the output portion 58 every 1H period. Referring to FIG. 1(b), reference numeral 52 denotes a pulse generator including the circuits shown in FIG. 1(a) and 53 denotes a signal processor. Further, 59 denotes the output terminal of the solid-state image sensor 51.

Now, the charge transferring process in the horizontal CCD 57 will be described.

Figure 2A:
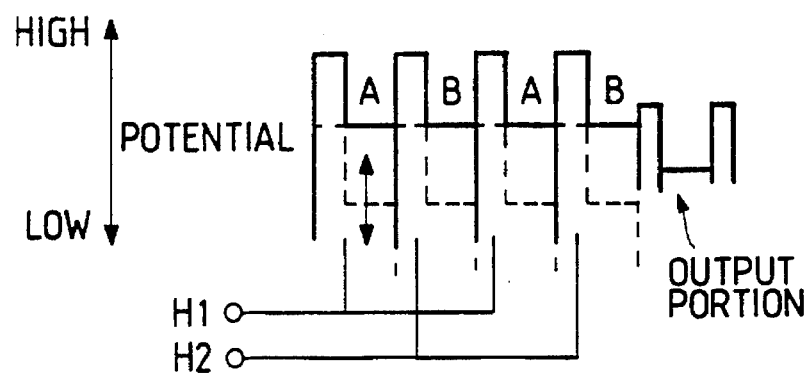
FIGS. 2(a), 2(b), and 2(c) are diagrams showing potential and charge transferring operation in the charge storing portions of a horizontal CCD within a solid-state image sensor.

Referring to FIG. 2(a), with one set of alternate charge storing portions of the horizontal CCD 57 denoted by A and the other set of alternate charge storing portions thereof denoted by B, scanning pulses H1 of "H" (high level) produced from the horizontal CCD scanning pulse HCCD are applied to the charge storing portions A and scanning pulses H2 whose "H" level differs from that of the scanning pulses H1 by 180° are applied to the charge storing portions B. Potentials at the charge storing portions A and B go high as indicated by the solid lines when a voltage of "L" (low level) is supplied, i.e., when the scanning pulses H1 or H2 are not supplied, and the potentials go low when the scanning pulses H1 or H2 of "H" are supplied.

Figure 2B:
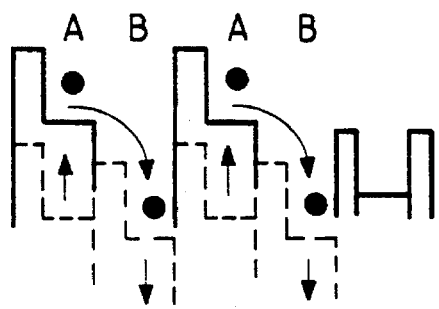
Figure 2C:
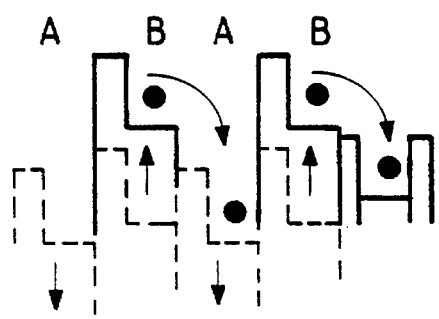

We now suppose that charges exist in the charge storing portions A and the scanning pulses H2 are applied to the charge storing portions B. Then, the potentials of the charge storing portions A go high and the potentials of the charge storing portions B go low as shown in FIG. 2(b). Thereby, charges in each charge storing portion A indicated by the black dot are transferred to the charge storing portion B of the adjoining stage. Next, when the scanning pulses H1 are applied to the charge storing portions A, the potentials of the charge storing portions A go low and the potentials of the charge storing portions B go high as shown in FIG. 2(c). Thereby, the charges in each charge storing portion B are transferred to the charge storing portion A of the next stage, and hence the charges of the last charge storing portion B are output to the output portion 58. Through repetition of the above described operations, the charges in the charge storing portions are simultaneously transferred one stage at a time and charges are sequentially output from the last charge storing portion.

Similar operations to the above take place also in the vertical CCDs.

Thus, the later described vertical high speed scanning pulse generator 6, vertical readout scanning pulse generator 7, adder 8, horizontal scanning pulse generator 9, and gate circuit 10 shown in FIG. 1(a) form a driver of the solid-state image sensor.

The controller 1 is made up of the timing generator 2, vertical high speed scanning timing generator 3, vertical readout scanning timing generator 4, and gate timing generator 5. While the controller 1 is supplied with a synchronizing pulse VBLK indicating the vertical blanking period, the controller 1, in the ordinary image pickup mode, does not respond to the synchronizing pulse VBLK and makes no action. Accordingly, the vertical high speed scanning pulse generator 6 does not operate, whereas the vertical readout scanning pulse generator 7 performs its normal operation and its output pulse, as the vertical CCD scanning pulse VCCD, drives the vertical CCDs 56 of the solid-state image sensor. Meanwhile, the gate circuit 10 is held open and the horizontal scanning pulse HCCD from the horizontal scanning pulse generator 9 drives the horizontal CCD 57 of the solid-state image sensor.

Now, we call the area in the solid-state image sensor 51 made up of pixels of M rows and N columns from which charges can be read out the effective pixel area, and we call the area within the effective pixel area made up of pixels of M rows and N columns (where m<M, n≦N) from which actually necessary charges are read out the scanning pixel area.

In the case where the scanning pixel area of which m<M and n≦N is set up (for example, in an electronic zooming image pickup mode) in FIG. 1(a) and FIG. 1(b), charges in the pixels within the effective pixel area outside the scanning pixel area (hereinafter called the "extra-scanning pixel area") are swept out within a vertical blanking period. The timing of this sweep out is controlled by the controller 1.

More specifically, when the synchronizing signal VBLK indicating the vertical blanking period is supplied, the timing generator 2 decides the phases of the high speed scanning period of the vertical CCDs 56, the start of outputting of the vertical readout scanning pulse, and the stopping period of the transfer in the horizontal CCD 57. Upon the decision of the phase, the vertical high speed scanning timing generator 3 generates a timing pulse $S_{SW}$ and supplies this pulse to the vertical high speed scanning pulse generator 6. Responding to this timing pulse $S_{SW}$, the vertical high speed scanning pulse generator 6 generates a vertical high speed scanning pulse VHP, the frequency of which is sufficiently higher than that of the vertical readout scanning pulse, for sweeping out the charges of the pixels in the extra-scanning pixel area. Meanwhile, the vertical readout scanning timing generator 4 generates a timing pulse Sre and supplies this pulse to the vertical readout scanning pulse generator 7. Responding to this timing pulse Sre, the vertical readout scanning pulse generator 7 generates a vertical readout scanning pulse VRP for reading out the charges of the pixels in the scanning pixel area. The vertical high speed scanning pulse VHP and the vertical readout scanning pulse VRP are added together in the adder 8 and the added signal is supplied, as the vertical CCD scanning pulse VCCD, to the vertical CCDs 56 of the solid-state image sensor 51.

FIG. 3(a) shows the vertical CCD scanning pulse VCCD output from the adder 8, in which TH denotes the duration of the vertical high speed scanning pulse VHP and the time t1 is the starting point of the pulse VRP outputted by the vertical readout scanning pulse generator 7 in response to the timing signal Sre.

The gate timing generator 5 in the controller 1 generates a timing pulse Hst in response to the phase decided by the timing generator 2 and supplies the pulse to the gate circuit 10. The gate circuit 10 generates a gate signal whose duration is the same as the pulse outputting timing of the vertical high speed scanning pulse generator 6, whereby the horizontal CCD scanning pulse HCCD output from the horizontal CCD scanning pulse generator 9 is shut off. The horizontal CCD scanning pulse HCCD is that used for driving the horizontal CCD 57 of the solid-state image sensor 51.

FIG. 3(b) shows the horizontal CCD scanning pulse HCCD, in which TL indicates the period during which the horizontal CCD scanning pulse HCCD is shut off by the gate circuit 10.

During the vertical blanking period, charges in all of the pixels within the effective pixel area are transferred to the vertical CCDs 56 prior to the periods shown in FIGS. 3(a), 3(b), and 3(c), but during the period TH, charges in the extra-scanning pixel area are transferred through the vertical CCDs 56 at high speed and transmitted to the charge storing portions of the horizontal CCD 57. Thus, the horizontal CCD 57 receives more charges than usual. However, at this time (in the period TL), the horizontal CCD 57 is not supplied with the horizontal CCD scanning pulse HCCD at the level "H" but is supplied with the level "L", and therefore, as is apparent from the explanation given by FIGS. 2(a), 2(b), and 2(c), the potential of the horizontal CCD 57 is maintained higher than the potential of the output portion 58. Hence, a part of the charges transferred from the vertical CCDs 56 overflow the horizontal CCD 57 to be swept out to the output portion 58 as shown in FIG. 3(c).

When the period TL is over and the horizontal CCD 57 comes to be driven by the usual horizontal CCD scanning pulse HCCD, the charges from the extra-scanning pixel area remaining in the horizontal CCD are reduced, and hence they can be fully swept out to the output portion 58 during the vertical blanking period Vb1 as shown in FIG. 3(c).

In this way, the charges from the extra-scanning pixel area can be prevented from leaking into the video signal.

Figure 4:
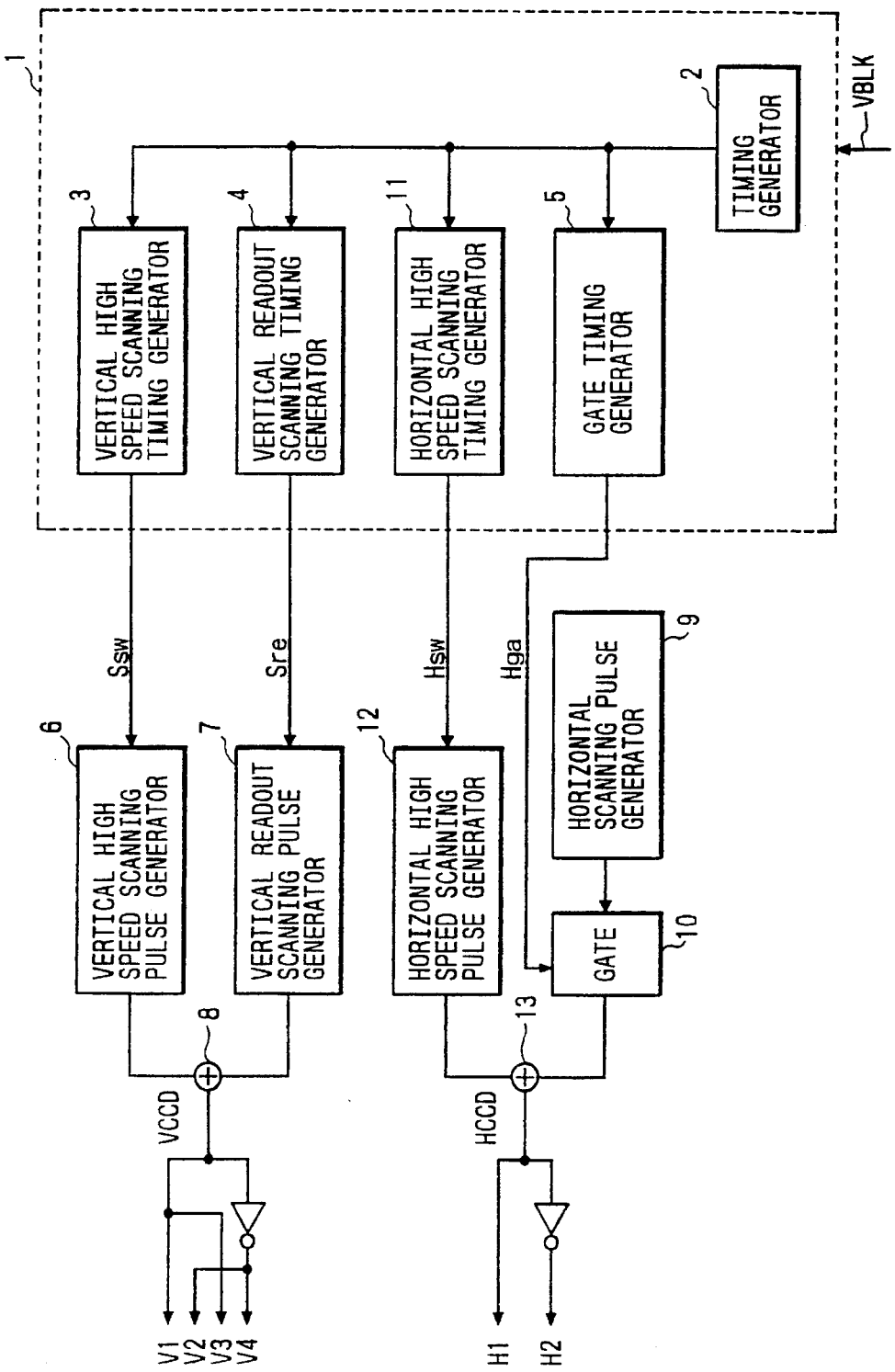
FIG. 4 is a block diagram showing a driver carrying out a second embodiment of a driving method of a solid-state image sensor according to the present invention.

FIG. 4 is a block diagram showing a driver carrying out another embodiment of a driving method of a solid-state image sensor according to the present invention, in which reference numeral 11 denotes a horizontal high speed scanning timing generator, 12 denotes a horizontal high speed scanning pulse generator, and 13 denotes an adder. Corresponding parts to those in FIG. 1(a) are denoted by corresponding reference numerals, and a duplicate explanation of them will be omitted.

Referring to FIG. 4, the gate circuit 10 generates a gate signal for the period from the starting point of the period TH to the point of time t1 in accordance with the timing signal Hga coming from the gate timing generator 5 as shown in FIG. 5(a), so that the output pulse from the horizontal scanning pulse generator 9 is shut off during the period of the gate signal. Meanwhile, the horizontal high speed scanning timing generator 11 generates a timing signal $H_{sw}$ indicating a period of time TD from the end of the period TL equal to the period TH within the gating period of the gate circuit 10 to the point of time t1, and during the period TD, the horizontal high speed scanning pulse generator 12 generates a horizontal high speed scanning pulse whose frequency is higher than the output pulse from the horizontal scanning pulse generator 9. The horizontal high speed scanning pulse and the output pulse from the gate circuit 10 are added together in the adder 13 and the added signal is used as the horizontal CCD scanning pulse HCCD for driving the horizontal CCD 57 of the solid-state image sensor 51.

Other operations than the above are the same as those in the embodiment shown in FIG. 1(a). The vertical CCD scanning pulse VCCD and the horizontal CCD scanning pulse HCCD output from the adders 8 and 13 are shown in FIGS. 5(a) and 5(b), respectively.

According to the present embodiment, since the potential of the horizontal CCD 57 goes high during the period TH the same as in the embodiment shown in FIG. 1(a), a part of charges in the pixels in the extra-scanning area transferred from the vertical CCDs 56 overflow the horizontal CCD 57 to be swept out to the output portion 58. In addition, the potential of the horizontal CCD 57 alternately and quickly cycles between the states shown in FIGS. 2(b) and 2(c) during the period TD, and thereby the charges from the pixels of the extra-scanning pixel area existing in the horizontal CCD 57 are completely swept out to the output portion 58. Therefore, the effect preventing leakage of the charges from the pixels of the extra-scanning pixel area into the video signal is further improved than in the embodiment shown in FIG. 1(a).

FIGS. 6(a), 6(b), and 6(c) show driving pulses in a further embodiment of a driving method of the solid-state image sensor according to the present invention.

In present embodiment, the reset gate of the output portion 58 is controlled to have charges in the pixels in the extra-scanning area swept out more effectively.

Figure 7:
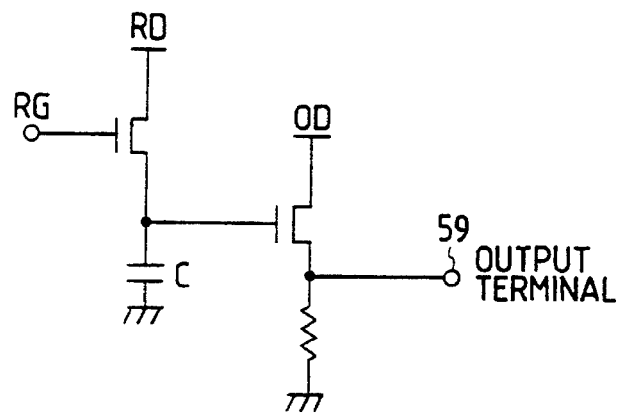
FIG. 7 is an equivalent circuit diagram of the output portion of the solid-state image sensor shown in FIG. 1(b)
Figure 8:
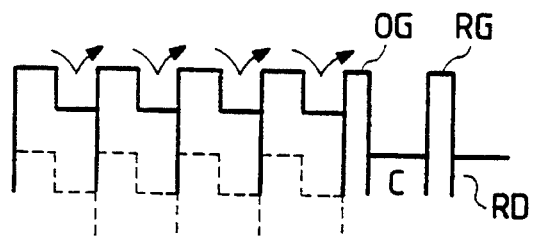
FIG. 8 is a diagram showing behavior of charges transferred from a horizontal CCD within a solid-state image sensor to the output portion shown in FIG. 7.

In the cases of the embodiments shown in FIG. 1(a) and FIG. 4, while the charges remaining untransferred in the horizontal CCD at the time when charges are swept out of the extra-scanning area by fast scanning are prevented from leaking into the video signal, the reset gate pulse RG supplied to the reset gate of the output portion 58 at that time is a pulse having constantly intermittent "H" pulses as shown in FIG. 6(d), the same as in the ordinary image pickup mode. When the reset gate pulse RG is applied to the reset gate, an MOS switch serving as the reset gate as shown in FIG. 7 is turned on, and thereby the charge storing portion C of the output portion 58 and the reset drain RD are brought to the same potential level. As a result, the charges transferred from the vertical CCDs to the horizontal CCD are output, pixel by pixel, to the reset drain RD as shown in FIG. 8. Therefore, even during the period TH or TL, the charges from the extra-scanning pixel area existing in the horizontal CCD are swept out to the reset drain RD every reset gate pulse RG.

In the present embodiment, however, the reset gate pulse is held at the level "H" throughout the period TL of the horizontal CCD scanning pulse HCCD as shown in FIG. 6(c). Consequently, during this period, the MOS switch serving as the reset gate is maintained on, and hence the potential of the charge storing portion C of the output portion and the potential of the reset drain RD are maintained at the same level. Thus, charges are constantly output from the charge storing portion of the horizontal CCD to the output terminal 59, and thereby the outputting efficiency of charges is improved and the effect preventing the charges remaining untransferred in the horizontal CCD from leaking into the video signal is much improved.

Figure 9:
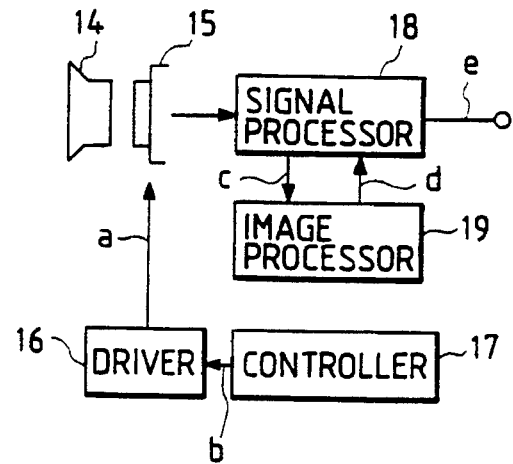
FIG. 9 is a block diagram showing an example of an imaging apparatus having an electronic zooming function utilizing a driving method of the present invention.

FIG. 9 is a block diagram showing a particular example of an imaging apparatus in which an electronic zooming function is realized using the above described embodiment of this invention. In FIG. 9, reference numeral 14 denotes a lens, 15 denotes a solid-state image sensor, 16 denotes a driver of the above described embodiment for driving the solid-state image sensor 15, 17 denotes a controller of the above described embodiment for controlling the driver 16, 18 denotes a signal processor for processing the signal output from the solid-state image sensor 15 and outputting the processed signal as a video signal, and 19 denotes an image processor for processing images in the signal taken out from the signal processor 18.

A zooming operation performed by the above particular example will be described below with reference to FIG. 10.

An image of an object formed on the photo-sensing surface of the solid-state image sensor 15 is photoelectrically converted by scanning of the solid-state image sensor 15 with a scanning pulse a from the driver 16 to an electric signal to be output from the solid-state image sensor 15.

Figure 10:
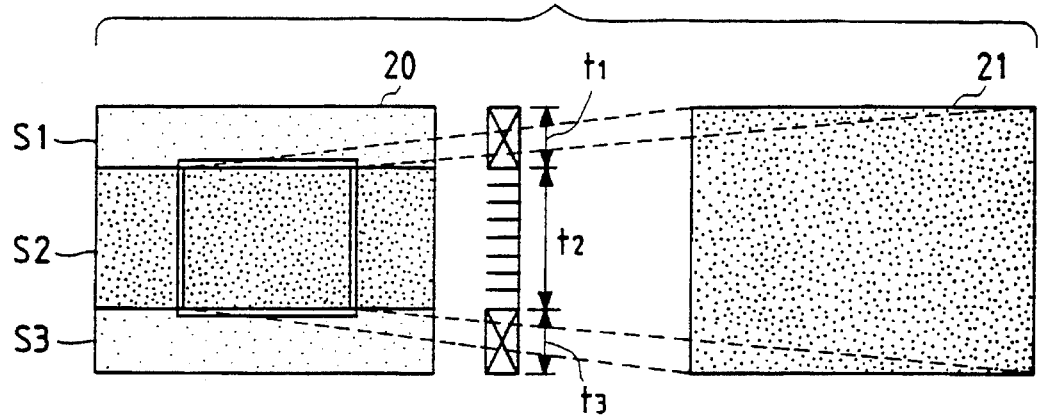
FIG. 10 is a diagram showing the photo-sensing surface and the monitor screen in the imaging apparatus shown in FIG. 9.

Referring now to FIG. 10, the photo-sensing surface 20 of the solid-state image sensor 15 is the effective pixel area and the area S2 is the scanning pixel area. Hence, the areas S1 and S3 become the extra-scanning pixel area. In this case, we assume that electronic zooming-in is performed, for example, by displayed the image in the area in the scanning pixel area S2 enclosed by the double frame on the entire surface of a monitor screen 21. Charges in the extra-scanning pixel area S1 and S3 of the solid-state image sensor 15 are swept out as described above. Periods corresponding to the areas S1, S2, and S3 will be denoted by t1, t2, and t3.

During the period t1 in FIG. 10, the driver 16, in response to a control signal b output from the controller 17 according to the power of zooming, provides the vertical CCD scanning pulse, in the scanning pulse a output therefrom, with a higher frequency than the ordinary frequency so that the vertical CCDs of the solid-state image sensor 15 are scanned at a higher speed during a vertical blanking period and the charges in the extra-scanning pixel area S1 are thereby swept out.

Then, during the period t2 in FIG. 10, the vertical CCD scanning pulse output from the driver 16 is controlled by a control signal from the controller 17 corresponding to the power of zooming (for example, so as to perform one scanning for each 2-H period when the power of zooming is 2), and thereby charge transfer is intermittently performed in the vertical CCDs and charges in the scanning pixel area S2 are read out.

Finally, during 6he period t3 in FIG. 10, charges in the extra-scanning pixel area S3 are swept out by fast scanning the same as in the sweep out of charges in the extra-scanning pixel area S1.

When the signal output from the solid-state image sensor 15 in the above described manner of driving is processed in the signal processor 18, since the charges in the scanning pixel area S2 are intermittently read out from the vertical CCDs, the image becomes elongated in the vertical direction. Therefore, the output signal c of the signal processor 18 is taken out through an interface into the image processor 19, and therein a zooming process in the horizontal direction is applied to the signal for the portion enclosed by the double frame in the area S2 in FIG. 10, and at the same time, an interpolation process is performed for the horizontal scanning periods dropped on account of the intermittent readout of the vertical CCDS. The output signal d from the image processor 19 processed as described above is sent back to the signal processor 18 through the interface to be output therefrom as a video signal e after being processed for addition of synchronizing signals thereto, etc. Thus, a video signal zoomed in both vertical and horizontal directions can be obtained.

Figure 11A:
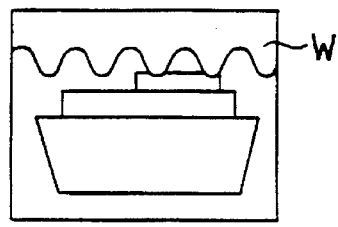
FIG. 11(a) is a diagram showing a monitor screen obtained when a solid-state image sensor is driven by a conventional driving method.
Figure 11B:
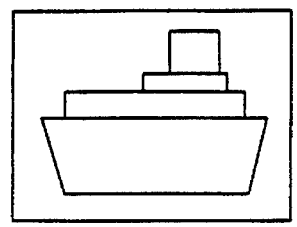
FIG. 11(b) is a diagram showing a monitor screen obtained when a solid-state image sensor is driven by a driving method of the present invention.

In this case, if the solid-state image sensor 15 is that of the conventional apparatus in which only high speed scanning in the vertical CCDs is performed, a white strip image W due to an overflow of charges is produced at the upper portion of the monitor screen as shown in FIG. 11(a), but by employing the method of the above described embodiment, the leakage of charges into the video signal can be prevented and an image having no such white strip as shown in FIG. 11(b) can be obtained.

Figure 12:
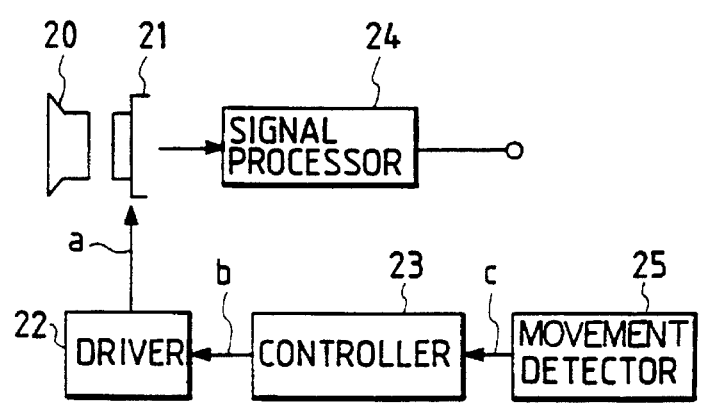
FIG. 12 is a block diagram showing an imaging apparatus having an image stabilizing function utilizing a driving method of the present invention.

FIG. 12 is a block diagram showing a particular example of an imaging apparatus in which a function for image stabilization is realized by employing the above described embodiment. In FIG. 12, reference numeral 20 denotes a lens, 21 denotes a solid-state image sensor, 22 denotes a driver for driving the solid-state image sensor 21, 23 denotes a controller for controlling the driver 22, 24 denotes a signal processor for processing the signal output from the solid-state image sensor 21 and outputting the processed signal as a video signal, and 25 denotes a movement detector.

Referring to FIG. 12, the image of an object formed on the photo-sensing surface of the solid-state image sensor 21 is photoelectrically converted, by driving the solid-state image sensor 21 with a scanning pulse a output from the driver 22, to an electric signal to be output from the solid-state image sensor 21. Also in this case, the scanning pixel area is set up in the effective pixel area as shown by the double frame in FIG. 10.

When a camera movement occurs during image pickup, the movement detector 25 detects an image movement caused by the camera movement and then outputs a control signal c. Responding to this control signal c, the controller 23 controls the driver 22 so that the position of the scanning pixel area of the solid-state image sensor 21 is changed. For example, when the image is moved a distance corresponding to m pixels in the vertical direction by a camera movement, the controller 23 causes the position of the scanning pixel area to move in the vertical direction a distance corresponding to —m pixels with a control signal b. The image movement is thereby canceled.

The driver 22, responding to the control signal from the controller 23, raises the frequency of the scanning pulse a for driving the solid-state image sensor 21 higher than the ordinary frequency in the vertical blanking period so that high speed scanning is performed to move the position of the scanning pixel area in the vertical and horizontal directions to such an extent that the movement detected by the movement detector 25 is thereby compensated for. Thus, the image movement is canceled.

According to the present embodiment as described above, the position of the scanning pixel area can be varied by controlling the driver of the solid-state image sensor, and thereby an electronic zooming function or an image stabilizing function can be realized. In this case, by controlling the scanning pulses for driving the vertical CCDs and the horizontal CCD of the solid-state image sensor, the scanning pulse for driving the vertical CCDs to sweep out the charges from the extra-scanning pixel area can be made higher in speed. Thereby, charges remaining untransferred in the horizontal CCD are prevented from leaking into the video signal.

Figure 13:
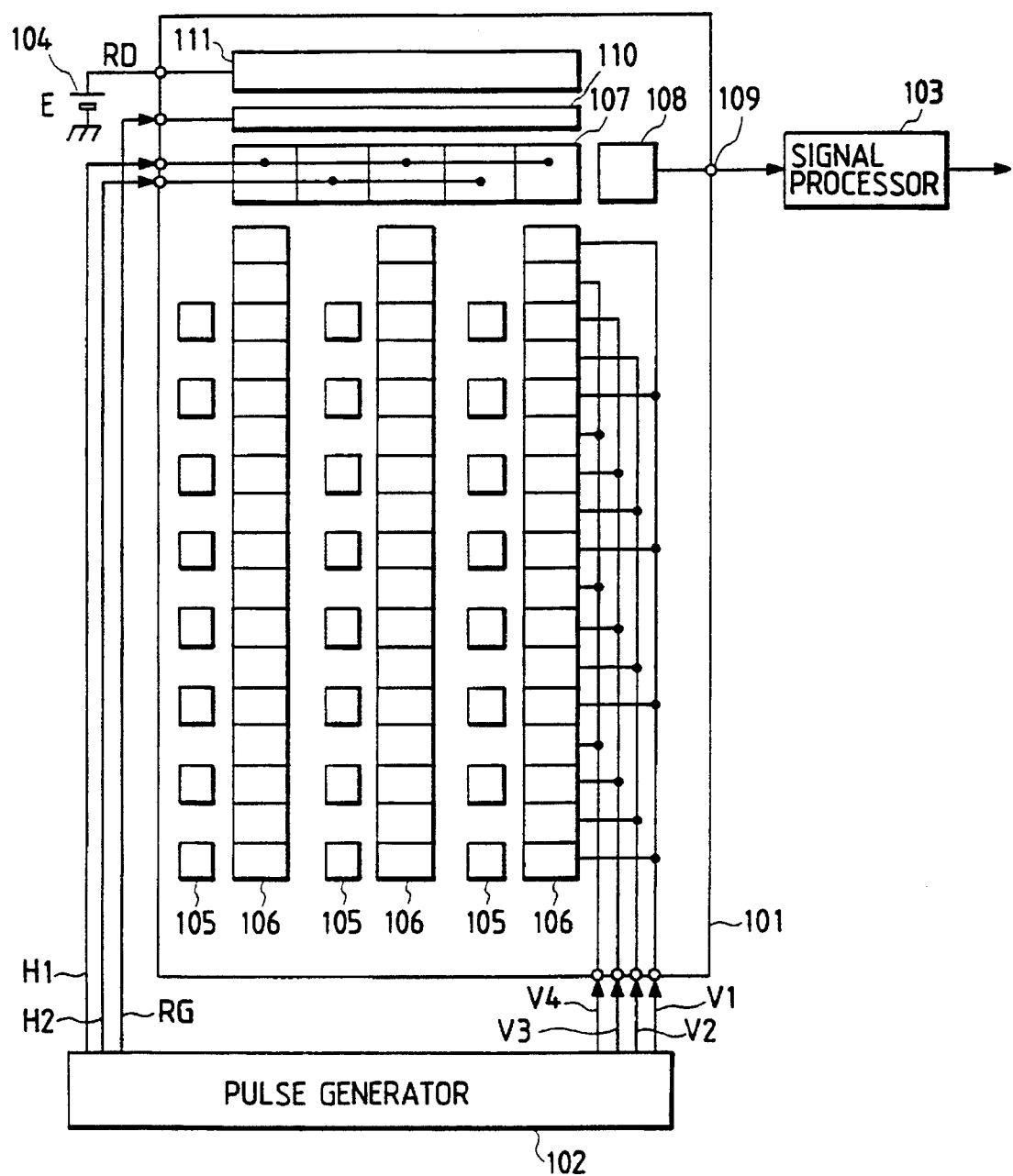
FIG. 13 is a plan view showing a solid-state image sensor according to a fourth embodiment of the present invention.

FIG. 13 is a diagram showing a solid-state imaging apparatus according to another embodiment of the present invention, in which reference numeral 101 denotes a solid-state image sensor, 102 denotes a pulse generator, 103 denotes a signal processor, 104 denotes a constant-voltage power supply, 105 denotes a pixel, 106 denotes a vertical CCD, 107 denotes a horizontal CCD, 108 denotes an output portion, 109 denotes an output terminal, 110 denotes a reset gate, and 111 denotes a reset drain.

In the solid-state image sensor of FIG. 13, a plurality of pixels 105 are disposed in an array. Normally, charges stored in these pixels 105 are transferred through the vertical CCDs 106 by vertical CCD transfer pulses V1 to V4 generated in the pulse generator 102, then transferred through the horizontal CCD 107 by horizontal CCD transfer pulses H1 and H2 generated by the pulse generator 102, and, after being processed in the output portion 108, supplied from the output terminal 109 to the signal processor 103 to be converted into a video signal. In such normal charge transfer, the charge transfer in the vertical CCDs 106 is performed once in 1H, and hence the charges from the vertical CCD 106 do not overflow the horizontal CCD 107. However, when charge transfer in the vertical CCDs 106 is performed several times in 1H, the charges overflow the horizontal CCD 107. Therefore, in the present embodiment, there are provided the reset gate 110 and the reset drain 111 for the horizontal CCD 107 so that the charges overflowing the horizontal CCD 107 are swept out to the outside through the reset gate 110 and the reset drain 111.

Figure 14:
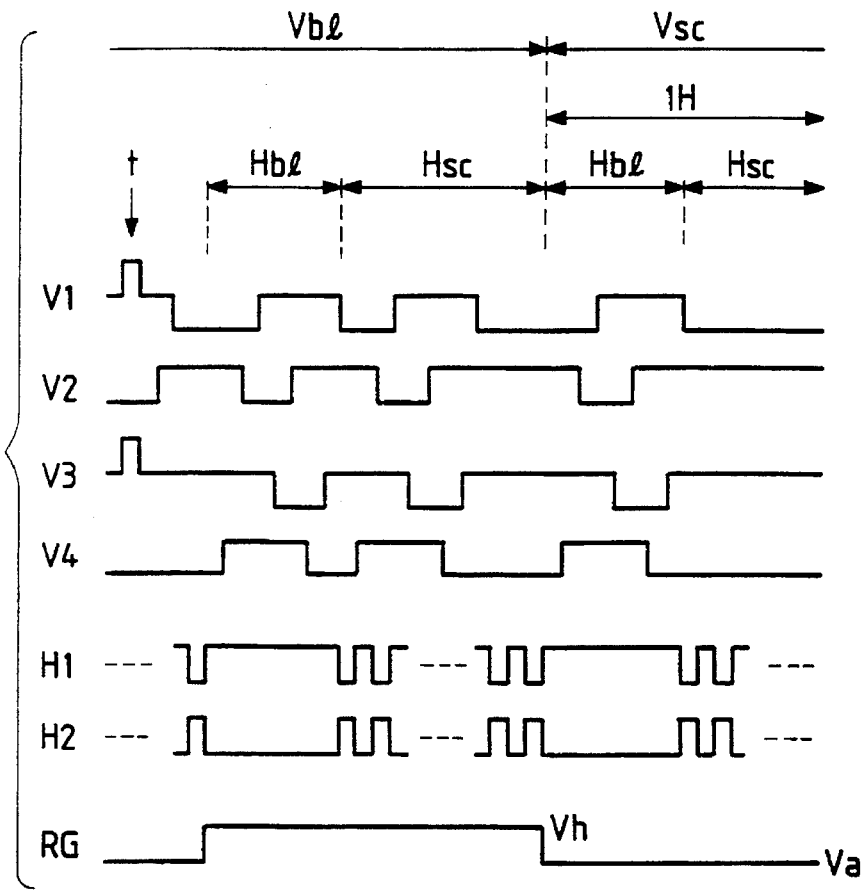
FIG. 14 is a timing chart of transfer pulses in the solid-state image sensor shown in FIG. 13.

We assume now that the area formed of the group of pixels 105 shown in FIG. 13 constitutes the effective pixel area. When zooming-in is performed, charges are read out from a portion of the pixels in the effective pixel area, and the area from which the pixels are read out is called the scanning pixel area. Here, we assume that the scanning pixel area starts from the fifth row of the effective pixel area on the side toward the horizontal CCD 107, and the case, as an example, where the charges stored in the pixels 105 in the effective area from the first to the fourth rows on the side toward the horizontal CCD 107 are transferred within 1H will be described with reference to FIG. 14 showing timing relationships of the transfer pulses in the arrangement of FIG. 13.

First, at the point of time t within the vertical blanking period Vb1, the charges stored in all the pixels 105 in the effective pixel area are transferred to the vertical CCDs 106. Then, the charges are transferred from the vertical CCDs 106 to the horizontal CCD 107 two times each in the horizontal blanking period Hb1 and in the horizontal scanning period Hsc and, at the same time, a reset gate pulse RG at a high level Vh is supplied from the pulse generator 102 to the reset gate 110, and thereby the charges in the horizontal CCD 107 are swept out to the reset drain 111 through the reset gate 110.

Figure 15:
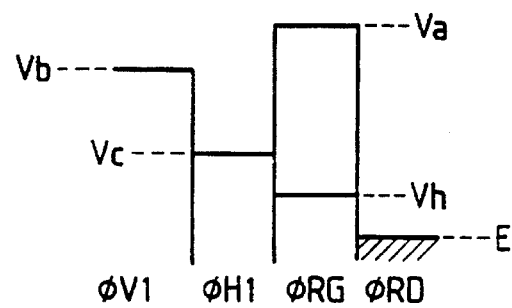
FIG. 15 is a diagram showing potentials for explaining operation of the solid-state image sensor shown in FIG. 13.

Potentials of the vertical CCDs 106, horizontal CCD 107, reset gate 110, and reset drain 111 at this time become as shown in FIG. 15. More specifically, referring to FIG. 15, when the potential Vb of a vertical CCDφV1 (the last stage of one of the vertical CCDs 106 shown in FIG. 13 driven by the vertical transfer pulse V1) is higher than the potential Vc of the horizontal CCDφH1 (one stage of the horizontal CCD 107 in FIG. 13 driven by the horizontal transfer pulse H1) adjoining the vertical CCDφV1, charges are transferred from the vertical CCDφV1 to the horizontal CCDφH1. Since the reset pulse RG is normally at a low level Va, the potential Va of the reset gateφRG (the reset gate 110 in FIG. 13) adjoining the horizontal CCDφH1 becomes higher than the potential Vc of the horizontal CCDφH1 and charges are not transferred from the horizontal CCDφH1 to the reset drainφRD fixed to the level of voltage E of the constant-voltage power supply 104. However, when the reset gate pulse RG is brought to a high level Vh, the potential Vh of the reset gateφRG becomes lower than the potential Vc of the horizontal CCDφH1, and therefore the charges are swept out from the horizontal CCDφH1 to the reset drainφRD.

If the potential Vb of the vertical CCDφV1, the potential Vc of the horizontal CCDφH1, and the potential Va of the reset gateφRG are set so that Vc <Vb<Va holds and Va is close to Vb, the reset gate pulse RG need not necessarily be a pulse. In this case, most of the charges flowing backward from the horizontal CCDφH1 to the vertical CCDφV1 are swept out to the reset drainφRD, and hence unwanted charges can be prevented from mixing into the video signal.

Figure 16:
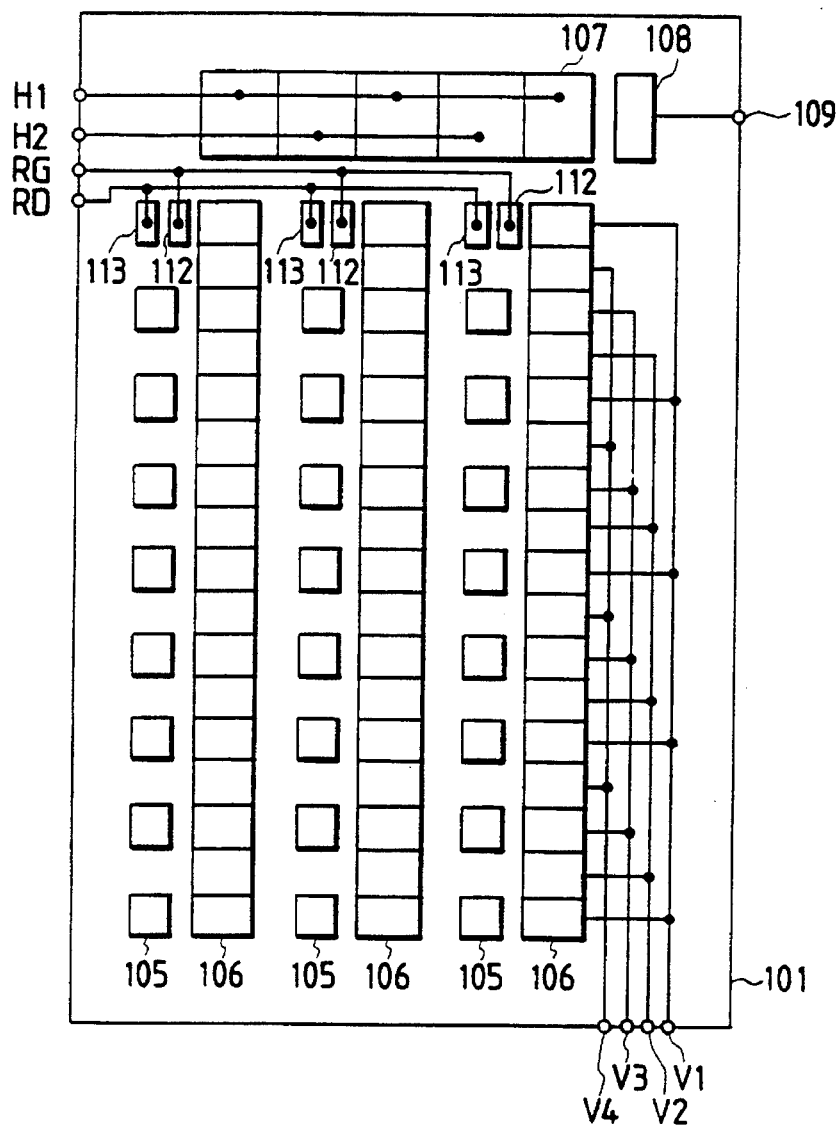
FIG. 16 is a plan view showing a solid-state image sensor according to a fifth embodiment of the present invention.

FIG. 16 is a diagram showing a solid-state imaging apparatus according to another embodiment of the present invention, in which reference numeral 112 denotes a reset gate and 113 denotes a reset drain, while corresponding parts to those in FIG. 13 are denoted by corresponding reference numerals.

What is different in this embodiment from the embodiment shown in FIG. 13 is that the reset gate 112 and the reset drain 113 are disposed adjacent to the last stage of each vertical CCD 106.

Figure 17:
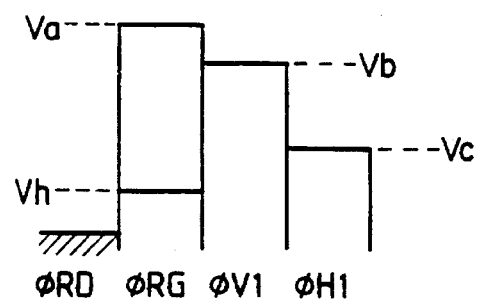
FIG. 17 is a diagram showing potentials for explaining operation of the solid-state image sensor shown in FIG. 16.

Referring to FIG. 16, a case where the charges stored in the pixels in the first to fourth rows of the effective pixel area on the side toward the horizontal CCD 107 are transferred within 1H will be described as an example. The timing of the vertical transfer pulses V1 to V4, horizontal transfer pulses H1 and H2, and the reset gate pulse RG is as shown in FIG. 14, the same as that in the embodiment shown in FIG. 13. The potentials of the vertical CCD 106, horizontal CCD 107, reset gate 112, and reset drain 113 are shown in FIG. 17 using corresponding reference numerals to those used in FIG. 15.

Since the reset gate pulse RG is normally at a low level, the potential V1 of the reset gateφRG is higher than the potential of the vertical CCDφV1, and hence the charges are not transferred from the vertical CCDφV1 to the reset drainφRD. When the reset gate pulse RG is brought high, however, the potential Vh of the reset gateφRG becomes lower than the potential of the vertical CCDφV1, and hence the charges are swept out from the vertical CCDφV1 to the reset drainφRD every time the charges are transferred to the vertical CCDφV1.

Figure 18:
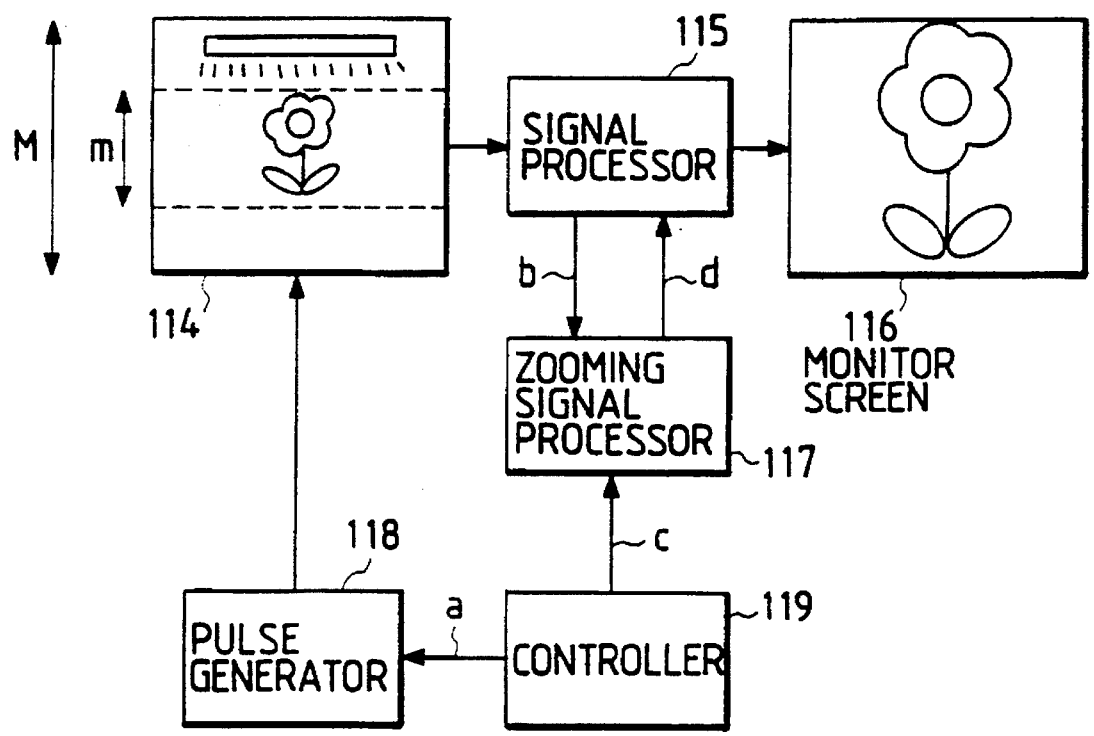
FIG. 18 is a block diagram showing an example of a solid-state imaging apparatus employing the solid-state image sensor shown in FIG. 13 or FIG. 16.

FIG. 18 is a block diagram of a particular example of a solid-state image sensing apparatus arranged to be capable of electronic zooming with the above described embodiment applied thereto, in which reference numeral 114 denotes a solid-state image sensor, 115 denotes a signal processor, 116 denotes a monitor screen, 117 denotes a zooming signal processor, 118 denotes a pulse generator, and 119 denotes a controller.

Referring to FIG. 18, the pulse generator 118, responding to a control signal a from the controller 119, supplies horizontal and vertical transfer pulses to the solid-state image sensor 114 so that charges stored in the pixels of a scanning pixel area having m pixels in the vertical direction are sequentially output, over one vertical scanning period, from the solid-state image sensor 114, which has an effective pixel area having M pixels in the vertical direction. The output signal from the solid-state image sensor 114 in such a read-out scanning becomes a signal representing an image zoomed-in by a power of M/m in the vertical direction, because the normal operation is such that charges stored in the pixels of the effective pixel area which has M pixels in the vertical direction are sequentially output over one vertical scanning period.

The output signal from the solid-state image sensor 114 is subjected to processing such as amplification in the signal processor 115 and then supplied, as a signal b, to the zoom signal processor 117. The zooming signal processor 117, responding to a control signal c from the controller 119, applies zooming processing, such as zooming-in in the horizontal direction by the power of M/m, to the signal b. A signal d having undergone zooming processing is sent back to the signal processor 115 and therein subjected to processing such as attaching synchronizing signals thereto and converted to a video signal. The charges stored in (M—m) pixels in the vertical direction of the effective pixel area outside the scanning pixel area are swept out during the vertical blanking period in the manner described in the above embodiment.

Figure 19:
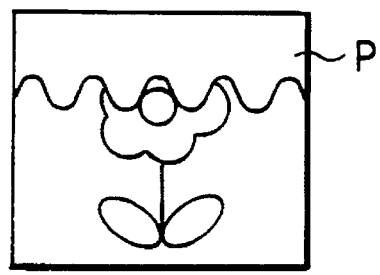
FIG. 19 is a diagram showing an example of reproduced image in a conventional solid-state imaging apparatus.

Referring to FIG. 18, when it is supposed that an image of an object (not shown) illuminated by a fluorescent lamp or the like so as to become very bright is formed on the solid-state image sensor 114, the quantity of the charges to be swept out becomes great. If the embodiment as described above is not used, then the charges which have not been swept out completely during the vertical blanking period will appear on the monitor screen as a white curtain-like pseudo image P as shown in FIG. 19. The above described sweep out of charges prevents such a pseudo image from being produced.

FIG. 20 is a block diagram of another particular example of a solid-state image sensing apparatus arranged to be capable of electronic zooming with the above described embodiment applied thereto, in which reference numeral 120 denotes a movement detector. Other parts corresponding to those in FIG. 18 being denoted by corresponding reference numerals, a duplicate explanation of the same will be omitted.

Referring to FIG. 20, this particular example is an imaging apparatus intended to prevent occurrence of an image movement due to a camera movement of the like and it is provided by adding the movement detector 120 to the particular example shown in FIG. 18. An image movement due to a camera movement or the like is detected by the movement detector 120 formed of a gyro or the like. The controller 119, responding to the result of detection, controls the pulse generator 118 so that the number of pixels from which charges are swept out during the vertical blanking period of the solid-state image sensor 114 is changed from m1 to m2 to thereby cancel the movement. More particularly, supposing that while an image of an alphabetical letter A was being formed on the solid-state image sensor 114, image of the alphabetical letter A was shifted upward by a camera movement. Then, the number of pixels from which charges are swept out changes from m1 to m2, whereby the movement of the image due to the camera movement.

According to the embodiments as described in the foregoing, even if unwanted charges are transferred from the vertical CCDs to the horizontal CCD several times during 1H, a part of the charges are swept out of the horizontal CCD, and hence they do not overflow the horizontal CCD. Therefore, a pseudo signal is prevented from mixing into the video signal and excellent functions for electronic zooming, image stabilization, and the like can be realized.

What is claimed is:

1. A method of driving a solid-state image sensor having an effective pixel area constituted by M×N pixels disposed in a matrix array having M pixels in the vertical direction and N pixels in the horizontal direction, wherein a scanning pixel area constituted by m pixels in the vertical direction and n pixels in the horizontal direction (where M>m, N≧n) is established within said effective pixel area, and wherein charges stored in the pixels in said scanning pixel area are transferred by vertical CCDs driven with a first scanning pulse to a horizontal CCD and the charges transferred to said horizontal CCD are transferred by said horizontal CCD driven with a second scanning pulse to an output portion of said horizontal CCD, said method comprising the steps of:

stopping the driving of said horizontal CCD;

driving said vertical CCDs with a third scanning pulse having a higher frequency than the frequency of said first scanning pulse so that charges stored in the pixels in said effective pixel area which are outside said scanning pixel area are transferred at high speed to said horizontal CCD while the driving of said horizontal CCD is stopped; and driving said horizontal CCD with said second scanning pulse so that the charges transferred from the pixels in said effective pixel area which are outside said scanning pixel area to said horizontal CCD are transferred to said output portion of said horizontal CCD.

2. A method according to claim 1, wherein said output portion of said horizontal CCD is held in a reset state for a predetermined period so that the charges transferred from the pixels in said effective pixel area which are outside said scanning pixel area to said horizontal CCD are swept out.

* * * * *